United States Patent [19]

Kossor

[11] Patent Number: 4,741,701

[45] Date of Patent: May 3, 1988

[54] APPARATUS FOR PROVIDING VISUAL FEEDBACK CONCERNING BEHAVIOR

[76] Inventor: Steven A. Kossor, R.D. #6, Coatesville, Pa. 19320

[21] Appl. No.: 26,769

[22] Filed: Mar. 17, 1987

Related U.S. Application Data

[63] Continuation-in-part of Ser. No. 912,599, Sep. 29, 1986, abandoned.

[51] Int. Cl.⁴ .............................................. G09B 1/14
[52] U.S. Cl. .................................... 434/238; 116/321; 116/209
[58] Field of Search ............... 434/238, 236; 116/201, 116/209, 281, 306, 321

[56] References Cited

U.S. PATENT DOCUMENTS

| | | | |
|---|---|---|---|
| 2,340,139 | 1/1944 | Norford | 434/238 |
| 2,512,485 | 6/1950 | Cougias | 434/238 |
| 2,883,765 | 4/1959 | Blaine | 434/238 |
| 2,965,978 | 12/1960 | Olson | 116/306 |
| 3,290,796 | 12/1966 | Gurda | 434/238 |
| 3,782,009 | 1/1974 | Darnell | 35/23 R |
| 4,344,759 | 8/1982 | Albert | 434/238 |
| 4,384,855 | 5/1983 | Walsh | 434/238 |
| 4,412,447 | 11/1983 | McMahan | 116/321 |
| 4,440,396 | 4/1984 | Frudakis | 434/127 |

FOREIGN PATENT DOCUMENTS 422276 1/1947 Italy .................................. 116/321

Primary Examiner—John E. Murtagh
Assistant Examiner—Caroline D. Dennison
Attorney, Agent, or Firm—William H. Eilberg

[57] ABSTRACT

A behavior monitoring and status reporting ("feedback") device, and the method of its use, are disclosed. The device gives visual feedback to a person concerning his or her behavior, along a continuous or discrete interval scale. The user moves an indicator to show the current status of the monitored person's behavior as the person completes each of a series of objectives or satisfies other criteria to justify the receipt of rewards or penalties. The apparatus is intended for use in two primary applications, among others. In the first application, a series of objectives to be achieved by the person being monitored is defined by the user of the device, and posted on a removable panel. The indicator is then moved to the position opposite each objective as the objective is achieved. After the last objective is achieved, a reward is given. In the second application, the removable panal is partitioned into areas, each area (except the top-most area) being assocaited with a particular class of undesirable behaviors. When the person being monitored displays undesirable behavior, the indicator is moved into the area corresponding to the level of undesirable behavior displayed, and a predetermined penalty is administered.

11 Claims, 2 Drawing Sheets

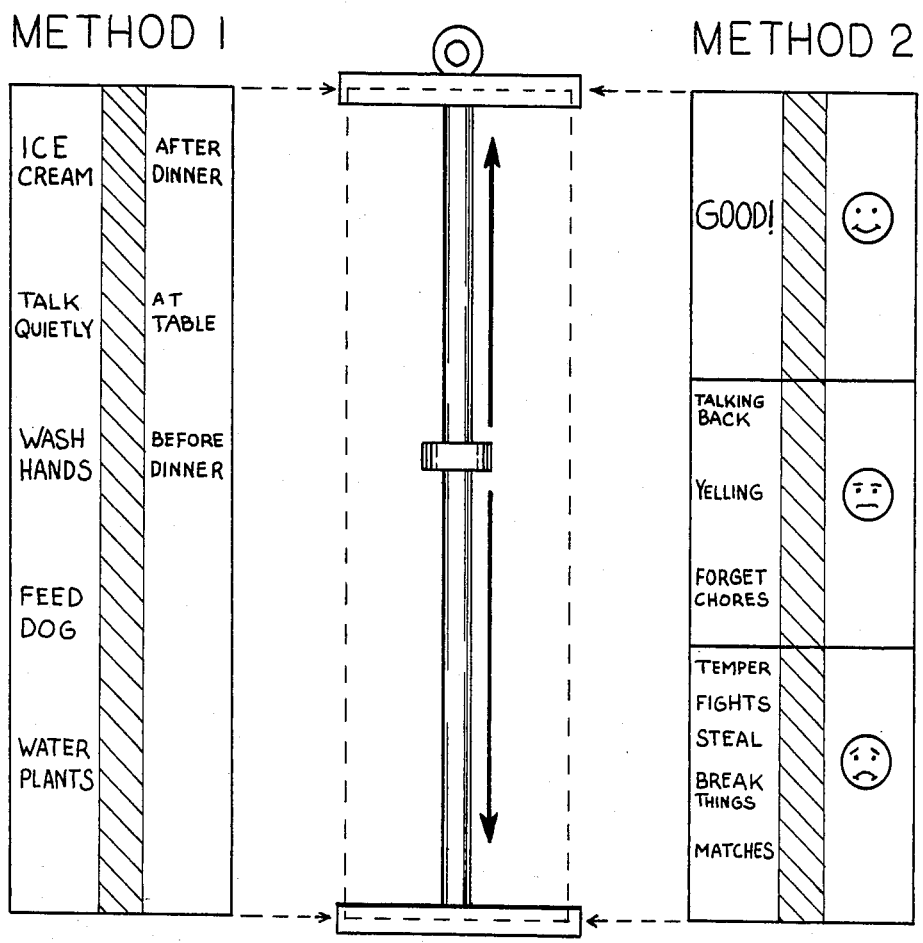

APPARATUS FOR PROVIDING VISUAL FEEDBACK CONCERNING BEHAVIOR

CROSS-REFERENCE TO PRIOR APPLICATION

This is a Continuation-in-Part of U.S. patent application Ser. No. 912,599, filed Sept. 29, 1986, now abandoned.

BACKGROUND OF THE INVENTION

This invention relates to methods for providing visual feedback concerning behavior, and the use of such methods in discouraging inappropriate behavior, and in rewarding desirable behavior. The invention is especially suited for use with children.

In the field of psychology, and especially in the area of behavior modification, the importance of providing "feedback", i.e. readily-understood information concerning the impact of behavior, has been long recognized. Feedback enables a person to know whether or not his or her behavior has been acceptable, and helps the person to control his or her impulses to behave inappropriately, because feedback helps the person to anticipate the response which will be given to his or her behavior by others.

It is considered desirable that feedback be provided as quickly as possible following the display of a behavior, so that the person will be able quickly and clearly to associate the feedback with the behavior for which it was given. Feedback is considered to be of paramount importance in any new learning situation, such as any of those to which young children are exposed daily, both in and out of classrooms.

It is considered desirable also to provide ongoing feedback, as distinguished from intermittent feedback, so that the person can know, with certainty, that a given behavior will result in a particular, specific, and consistent response. Whenever a particular behavior is displayed, it is considered desirable for the same type of response to be given to it, thereby encouraging the person to form accurate expectations about the behavior of his or her environment.

Finally, it is considered desirable for the "rules" of acceptable social behavior to be established clearly and without ambivalence, especially during the process of socializing the young child.

"Report cards" have long been used to provide visual feedback to students, concerning their behavior in school classrooms. At home, parents have used a "checklist" of their children's responsibilities to aid in determining whether their children have earned their allowance money or other rewards. Various types of consumer products have appeared which are intended to assist parents in monitoring and managing their children's behavior.

Parents have long sought assistance in disciplining their children. All of the authoritative sources have agreed that any disciplinary procedure must be administered fairly if the child is to develop his or own internal sense of right and wrong. It is widely agreed that any discipline procedure which is administered too long after the corresponding behavior is less effective than discipline which is administered promptly. With the increased publicity given to the problem of child abuse, parents today are understandably wary of using corporal punishment, and there is a substantial body of evidence to support the proposition that corporal punishment is less effective in making long-term changes in behavior than other types of discipline. The denial or suspension of privileges, in proportion to the severity of the behavior exhibited, is considered to be the best response to most types of undesirable behavior.

In each of the examples discussed above, a discrete interval scale has been used. The present invention permits the use of both discrete and continuous interval scales, and permits the rapid adjustment of feedback concerning behavior from moment to moment in a highly visual, effective, personalized, and easily-operated format. The apparatus of the present invention is also inexpensive and self-contained. It facilitates the delivery of rewards or penalties, as appropriate, as soon as possible after the behavior is displayed.

SUMMARY OF THE INVENTION

In the preferred embodiment, the apparatus of the present invention includes a shaft which is held between top and bottom end pieces. An indicator is mounted to slide along the shaft. A removable panel, located behind the shaft, is also held in place by the end pieces. The panel contains various written indicia, including words or symbols. The particular use of the apparatus determines the nature of the indicia on the panel.

The apparatus has two main uses. The first use is to promote acceptable behavior; the second is to discourage bad behavior. The first use is also denoted as the discrete case, because it encourages the achievement of a discrete set of objectives. The second use is designated as the continuous case, because it provides a visual indication of a continuous spectrum of "bad" behaviors.

According to the first method of use, a series of objectives is written on the panel, in the order in which the objectives should be achieved, from bottom to top. At the top of the panel, a reward is written. For example, the objectives could be a series of chores which a child is expected to perform, and the reward designated could be "ice cream after dinner". As the child performs each chore, the indicator is moved up the shaft. When all the chores are completed, the indicator is at the top of the shaft, and the reward is given. While the chores have not all been completed, the indicator will be below the top of the shaft, and the child has a visual indication of how much further the indicator must travel before the reward is received.

In the second main use of the apparatus, the panel contains a continuous scale of behaviors, ranging from the absence of bad behavior, near the top of the panel, to the exhibiting of very bad behavior, at the bottom. When the person being monitored exhibits a certain behavior, either good or bad, the indicator is moved upward or downward, to reflect the nature of the behavior. The indicator can be moved through a virtually infinite set of gradations, giving immediate visual feedback to the person being monitored, concerning the appropriateness of the behavior shown. Punishments can be initially established for each region of the panel, so that the user of the device can administer reasonable punishments consistently and immediately, in response to particular kinds of behaviors.

It is therefore an object of the present invention to provide a method for giving visual feedback concerning behavior.

It is another object of the invention to provide a method as described above, wherein the method tends to promote certain predefined "good" behaviors and to discourage predefined "bad" behaviors.

It is another object to provide a method as described above, wherein the method can be used to encourage the achievement of a series of predefined objectives.

It is another object to provide a method as described above, wherein the method can give visual feedback for a continuous range of behaviors.

It is another object of the invention to provide an apparatus which can be used to practice the methods described above.

It is another object of the invention to provide an apparatus, as described above, which apparatus is simple to use, inexpensive to build, and adaptable for use in monitoring the behavior of more than one person at one time.

Other objects and advantages of the invention will be apparent to those of ordinary skill in the art, from a reading of the following brief description of the drawings, the detailed description of the invention, and the appended claims.

BRIEF DESCRIPTION OF THE DRAWINGS

FIG. 2 is a diagram showing the apparatus of the present invention with two alternative panels which are ready to be inserted into the apparatus, the illustrated panels having discrete and continuous interval scales, respectively.

DETAILED DESCRIPTION OF THE INVENTION

Figure 1:
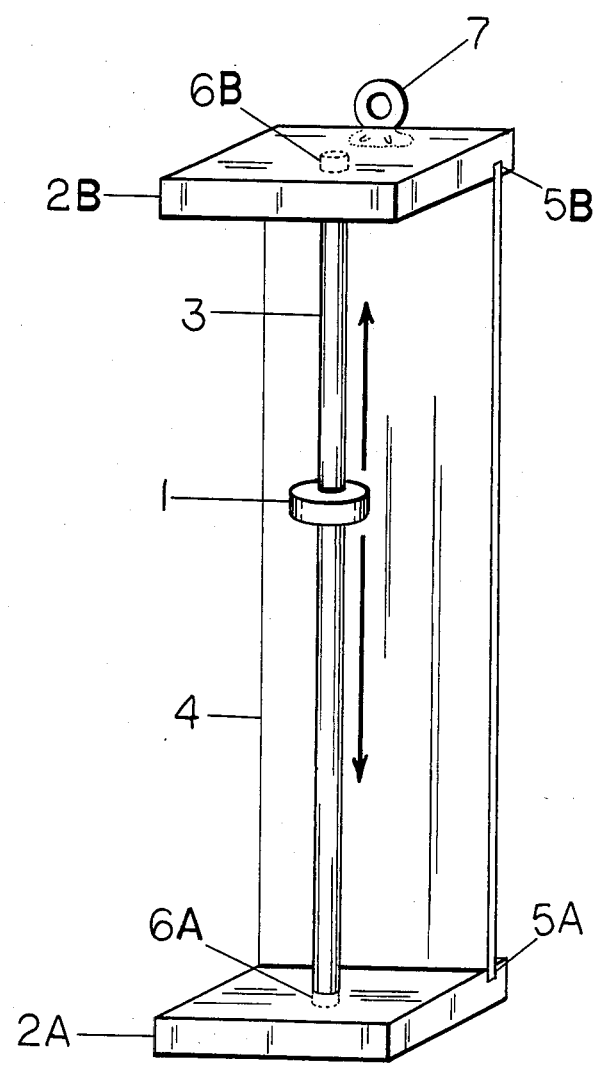
FIG. 1 is a perspective view of an apparatus which can be used in practicing the present invention.

The apparatus of the present invention is shown in the perspective view of FIG. 1. Indicator 1 is mounted on shaft 3, the indicator being capable of sliding along the shaft, as shown by the arrows. The shaft is held parallel to, and in front of, removable panel 4. The panel and the shaft are held in place by top and bottom end pieces, designated by reference numerals 2B and 2A, respectively. The panel fits into grooves or slots 5B and 5A, of the end pieces, and the shaft fits within circular recesses 6B and 6A.

The apparatus can be suspended, from a wall, in the vertical position, by engaging the hole in bracket 7, attached to top end piece 2B, with a suitable hook or hanger. It is also possible to stand the apparatus upright on bottom end piece 2A, without external support. The apparatus can also be operated in a horizontal position by placing it on any flat surface large enough to support both end pieces.

The indicator is connected to the shaft with sufficient tightness that it will remain in its position, due to friction, until moved. But the indicator must not hold the shaft so tightly that it cannot be moved easily.

The removable panel provides a surface on which various indicia can be displayed. It is possible to write the indicia directly onto the panel. It is also possible to affix various indicia by using stickers, or other fastening means.

FIG. 2 shows two alternative configurations for the removable panel, corresponding to the two main methods of practicing the present invention. At the center of FIG. 2, there is shown the apparatus of FIG. 1, but without the removable panel. The dotted line indicates where the panel will fit. At the left-hand side of the figure is a diagram of a panel having a discrete interval scale. At the right-hand side of the figure is a diagram of the panel having a continuous interval scale.

The operation of the invention will be described with respect to the specific panel configurations shown in FIG. 2, it being understood that many other configurations are possible.

Throughout this description, the term "user" means the person who is monitoring the behavior of another. If the person being monitored is a child, then the "user" is usually the parent.

Suppose that the user wants to reward good behavior, and to encourage the achievement of certain objectives. These objectives could be as shown on the panel at the left-hand side of FIG. 2. As shown in the figure, the objectives could be "watering the plants", "feeding the dog", "washing hands before dinner", and "talking quitely at the table". As the child fulfills each of these objectives, the indicator is moved upward to the level corresponding to the objective which was last achieved. The reward for achievement of all objectives is written at the top of the panel. In FIG. 2, this reward is "ice cream after dinner". Whatever the reward, it should be given as soon as reasonably possible after the achievement of the last objective.

Note that, when using this method, the top portion of the panel must be reserved for displaying the reward.

It is preferable to leave space between objectives, so that the person being monitored will see that each objective differs from those which precede and follow it. Also, the user should not write in the shaded region of the panel, shown in FIG. 2, because this region is hidden by the shaft and indicator when the panel is inserted into the apparatus.

The same set of objectives and rewards can be used from day to day, or they can be varied. The user may prepare several different panels, which can be inserted into the apparatus on different days. Each panel can have a different configuration of objectives and/or a different reward. The panel could also be made with a slate surface, so that the configuration could be erased and a new one entered. Many other means of varying the content of the panel can also be used.

It is apparent that the person being monitored receives an immediate visual indication of the achievement of various objectives, and the displaying of appropriate behavior. As each objective is achieved, the indicator is moved higher, symbolizing the progress of the person being monitored, and showing the closeness of the goal.

The rewards can be given on a daily basis, or at more or less frequent intervals. It is preferable to use shorter intervals with young children, who usually like daily rewards. In fact, it may be preferable to use two panels every day for a very young child, giving the child a chance to earn one reward at noon and another reward at bed-time, for completing entirely different "jobs" in the morning and afternoon/evening. Also, the appearance of the panel can be modified, and it is possible to place a sticker on the apparatus which gives the name of the child.

It is important that, if the monitored person does not do a job properly, that the user not "skip over" that job. A child needs to learn that every job is important, and that he or she cannot obtain rewards by skipping work. Naturally, the user must be sure that none of the jobs on the panel are too difficult for the child, and that the child receives help when it is truly needed. One should never do the job for the child, but it is acceptable to remind the child that a job needs to be done, if the child appears to have forgotten. If the child no longer seems motivated by the reward written on the panel, it may be best to change the reward to one for which the child will strive more diligently.

As explained above, the apparatus can also be used to discourage bad behavior. In this case, the apparatus is used to practice the second alternative method, mentioned above. This is the "continuous" method, and the configuration of the panel can be as shown at the right-hand side of FIG. 2.

In the continuous method, the user first establishes a spectrum of types of behavior, ranging from very bad behaviors, to the absence of any bad behavior. As shown in the right-hand panel of FIG. 2, the behaviors of the spectrum may be grouped into classes, and corresponding words or symbols may be used to identify each class. Thus, in the example shown in the figure, the worst behaviors are playing with matches, breaking things, stealing, fighting, and showing temper tantrums. A sad face is used to label this class of behaviors. The behaviors are listed in order of severity within the class, with the most severe behavior being nearest to the bottom. The next class of bad behaviors includes forgetting chores, yelling, and "talking back", and is symbolized by a face which is neither smiling nor frowning. The top-most region of the panel indicates the absence of bad behavior, and can be accompanied by a smiling face, as shown.

Each class of behaviors can also be symbolized by a color. For example, the bottom-most class can be colored red, the middle class can be colored yellow, and the top-most class can be colored green. Any other means of designating the severity of behaviors can be used. For very young children, it is necessary to provide some kind of nonverbal, immediately understandable symbol to reflect the severity of the behavior.

After the user has listed the behaviors and determined their relative severities, the user must establish the punishments to be associated with each level of behavior.

The indicator is initially placed at the top-most region of the shaft, indicating that, initially, the monitored person is given credit for displaying no undesirable behavior. When the indicator is in this top-most region, the person being monitored experiences unrestricted access to privileges. When the person being monitored exhibits a certain type of undesirable behavior, the indicator is immediately moved to the position most closely corresponding to the severity of the behavior. The user should be sure that the monitored person sees the indicator move, and the penalty should be promptly administered. As in the discrete case, the apparatus thus gives immediate visual feedback concerning the desirability of the behavior shown.

Penalties should, in all cases, be reasonable and sufficient to discourage further display of the undesirable behavior, without causing excessive anxiety or discomfort to the monitored person. Penalties involving corporal punishment or the deprivation of basic human rights and dignity are counterproductive and should not be used. Penalties can be arranged by degree of severity, in terms of the period of time for which they are applied. That is, penalty periods for relatively less-severe behaviors can be shorter than those for relatively more-severe behaviors.

Certain penalties may be perceived as more severe by the person being monitored, and these penalties should be associated with more severe types of behavior. Thus, if the monitored person especially enjoys watching a particular television program, then the penalty of denying access to the television set when the program is on the air would be a relatively severe penalty, in the view of the monitored person.

After the penalty has been incurred, and after any penalty period is completed, the indicator should be returned to the top-most area of the panel, indicating that the monitored person has been sufficiently disciplined. At this point, all privileges which had been suspended are now reinstated.

The upward movement of the indicator can be accomplished in stages. If the movement originates at the bottom-most area of the panel, i.e. if the monitored person had displayed a very bad behavior, the user may want to move the indicator upward more gradually. In general, it is often best to impose a specific penalty and, upon completion of the penalty, to return the moitored person to a state of optimism. The indicator should thus be returned to the top-most area of the panel as soon as reasonable.

The user of the apparatus can reward the monitored person for recovering quickly after displaying inappropriate behavior by moving the indicator a short distance in the direction of the top-most portion of the panel, without actually leaving the boundaries of the area into which the indicator had been placed, and without restoring any privileges prematurely. Similarly, the user can indicate to the monitored person that his or her behavior is deteriorating, by moving the indicator down slightly, without leaving the boundaries of the area in which the indicator is located. The ability to move the indicator upward and downward within a given area of the panel is an important feature of a continuous interval scale.

The reinstatement of privileges, when the indicator is moved back to the top-most area, constitutes a reward to the monitored person. In this way, the monitored person is induced to refrain from displaying behaviors which produce unpleasant responses, i.e. penalties, and encouraged to display behaviors which produce pleasant responses, i.e. access to privileges and rewards.

Note that a single panel can be used for both uses described above. One side of the panel can be configured for the discrete case, and the other side can be designed for use with the continuous case.

The apparatus described above is capable of monitoring the behavior of only one person at a time. If more than one person must be monitored, as is the case if there are two or more children in a household, then each child could have one apparatus. Alternatively, the apparatus can be constructed with a plurality of shafts, indicators, and panels. The panels would be disposed side by side, with a shaft located in front of each. An indicator would be mounted on each shaft. Each panel or indicator can be labeled with the name of the particular person being monitored. In this way, one device can monitor several persons simultaneously.

While the invention has been described with respect to the embodiments shown, the invention can be modified in many ways. For example, the apparatus described can be replaced with a computerized display. Instead of an indicator tightly affixed to a shaft, there could be a cursor which is moved up and down on a screen.

Also, in the embodiment shown in the drawings, the structure of the shaft and indicator, shown in the Figures, can be changed. The shaft need not even have a circular cross-section. The numbers of objectives or behaviors displayed on the removable panels can be varied. As indicated above, the two main methods of practicing the invention are not exhaustive, and other methods are possible. These and other modifications are to be deemed within the spirit and scope of the following claims.

What is claimed is:

1. Apparatus for providing visual feedback concerning behavior, comprising:
   (a) a shaft,
   (b) an indicator mounted for slidable movement along the shaft,
   (c) a panel, and
   (d) a pair of end pieces,
   (e) wherein the end pieces comprise means for holding the shaft and the panel, and wherein the panel includes indicia indicating a plurality of objectives and at least one reward, wherein the indicator can be moved to a position corresponding to the achievement of an objective and the earning of a reward.

2. The apparatus of claim 1, wherein the end pieces include slots, adapted to receive the panel.

3. The apparatus of claim 2, wherein the end pieces include circular recesses, adapted to receive the ends of the shaft.

4. The apparatus of claim 3, further comprising means for suspending the apparatus from a wall.

5. The apparatus of claim 1, wherein the indicator is held in place, on the shaft, by friction, wherein the indicator can be moved freely along the shaft, and wherein the attachment of the indicator to the shaft is sufficiently tight that the indicator does not move when it is not being pushed along the shaft.

6. Apparatus for providing visual feedback concerning behavior, comprising:
   (a) a shaft,
   (b) an indicator mounted for slidable movement along the shaft,
   (c) a panel, and
   (d) a pair of end pieces,
   (e) wherein the end pieces comprise means for holding the shaft and the panel, and wherein the panel includes indicia indicating a plurality of behaviors, the behaviors being arranged in an order corresponding to their severity, wherein the indicator can be moved to a position corresponding to the type of behavior exhibited by a person being monitored.

7. The apparatus of claim 6, wherein the panel is divided into a plurality of regions, each region including a plurality of types of behavior.

8. The apparatus of claim 7, wherein each region includes a symbol indicative of the types of behavior within the region.

9. The apparatus of claim 6, wherein the end pieces include slots, adapted to receive the panel.

10. The apparatus of claim 9, wherein the end pieces include circular recesses, adapted to receive the ends of the shaft.

11. The apparatus of claim 6, wherein the indicator is held in place, on the shaft, by friction, wherein the indicator can be moved freely along the shaft, and wherein the attachment of the indicator to the shaft is sufficiently tight that the indicator does not move when it is not being pushed along the shaft.

* * * * *